United States Patent [19]
Simonian

[11] Patent Number: 5,456,120
[45] Date of Patent: Oct. 10, 1995

[54] METHOD AND APPARATUS FOR MEASURING THE RATE OF FLOW OF THE CONTINUOUS PHASE OF A MULTIPHASE FLUID

[75] Inventor: Sam Simonian, Welwyn Garden City, England

[73] Assignee: Schlumberger Technology Corporation, Houston, Tex.

[21] Appl. No.: 375,214

[22] Filed: Jan. 19, 1995

Related U.S. Application Data

[63] Continuation of Ser. No. 60,082, May 10, 1993, abandoned.

[30] Foreign Application Priority Data

May 12, 1992 [GB] United Kingdom ............ 9210212

[51] Int. Cl.$^6$ ............................................. G01F 1/68
[52] U.S. Cl. .............................................. 73/861.04
[58] Field of Search ...................... 73/861.01, 861.04, 73/861.06, 204.18

[56] References Cited

U.S. PATENT DOCUMENTS

| | | |
|---|---|---|
| 4,435,978 | 3/1984 | Glatz . |
| 4,659,218 | 4/1987 | de Lasa et al. ............. 73/861.04 |
| 4,974,446 | 12/1990 | Vigneaux . |
| 5,069,066 | 12/1991 | Djorup ..................... 73/204.18 |

OTHER PUBLICATIONS

Moujaes & Dougall, Experimental investigation of cocurrent two–phase flow in a vertical rectangular channel, Canadian Journal of Chemical Engineering, vol. 65, No. 5, Oct. 1987, pp. 705–715.

*Primary Examiner*—Richard E. Chilcot, Jr.
*Assistant Examiner*—Harshad Patel
*Attorney, Agent, or Firm*—Martin Hyden; Leonard W. Pojunas; Wayne Kanak

[57] ABSTRACT

The invention concerns a method of and apparatus for measuring the flow rate of a continuous phase in a flowing multiphase fluid. It includes the steps of measuring a velocity of the fluid with a thermal anemometer at a location in the flow and simultaneously measuring the passage of a discontinuous phase at the same location with a local probe system capable of measuring the passage of a discontinuous phase, and then using the measurement of the discontinuous phase to correct the measurement of the continuous phase so as to derive the flow rate thereof.

19 Claims, 4 Drawing Sheets

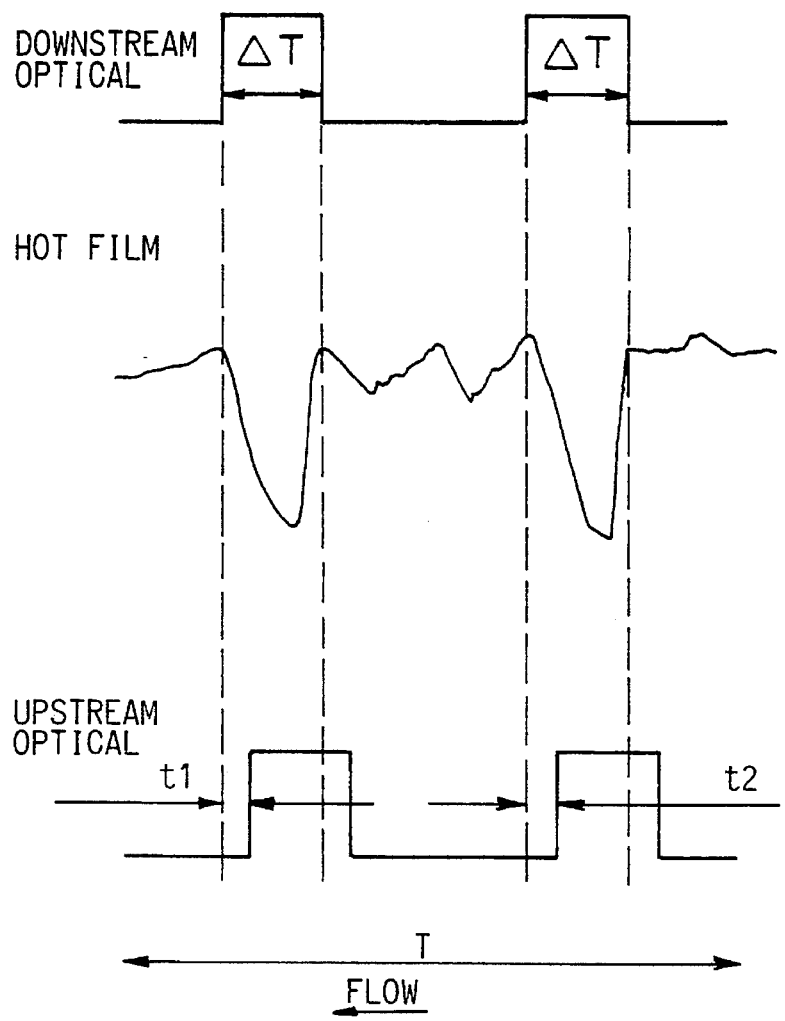
FIG. 3
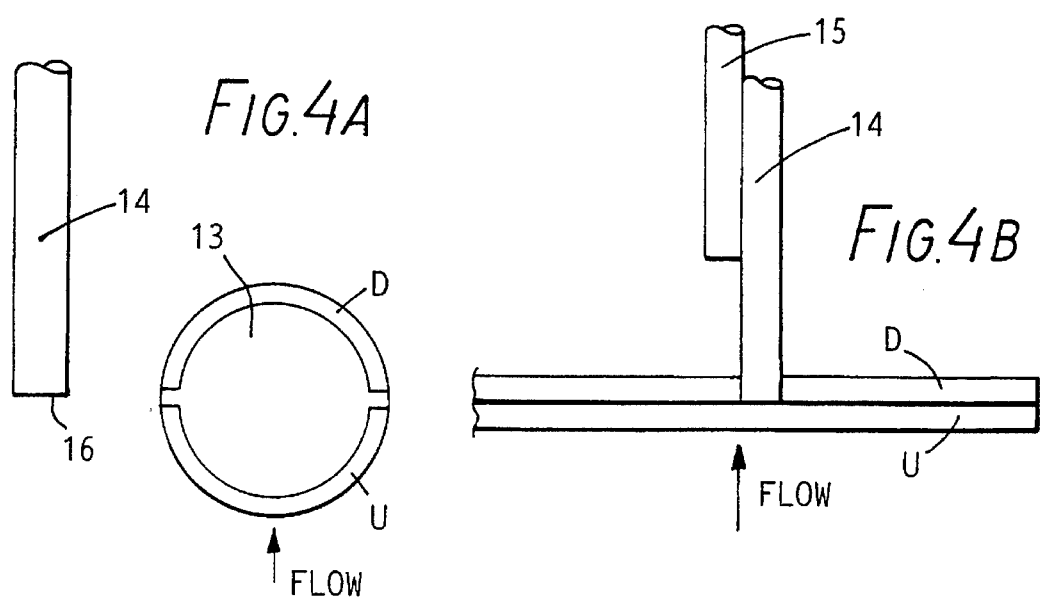
FIG. 4A
FIG. 4B

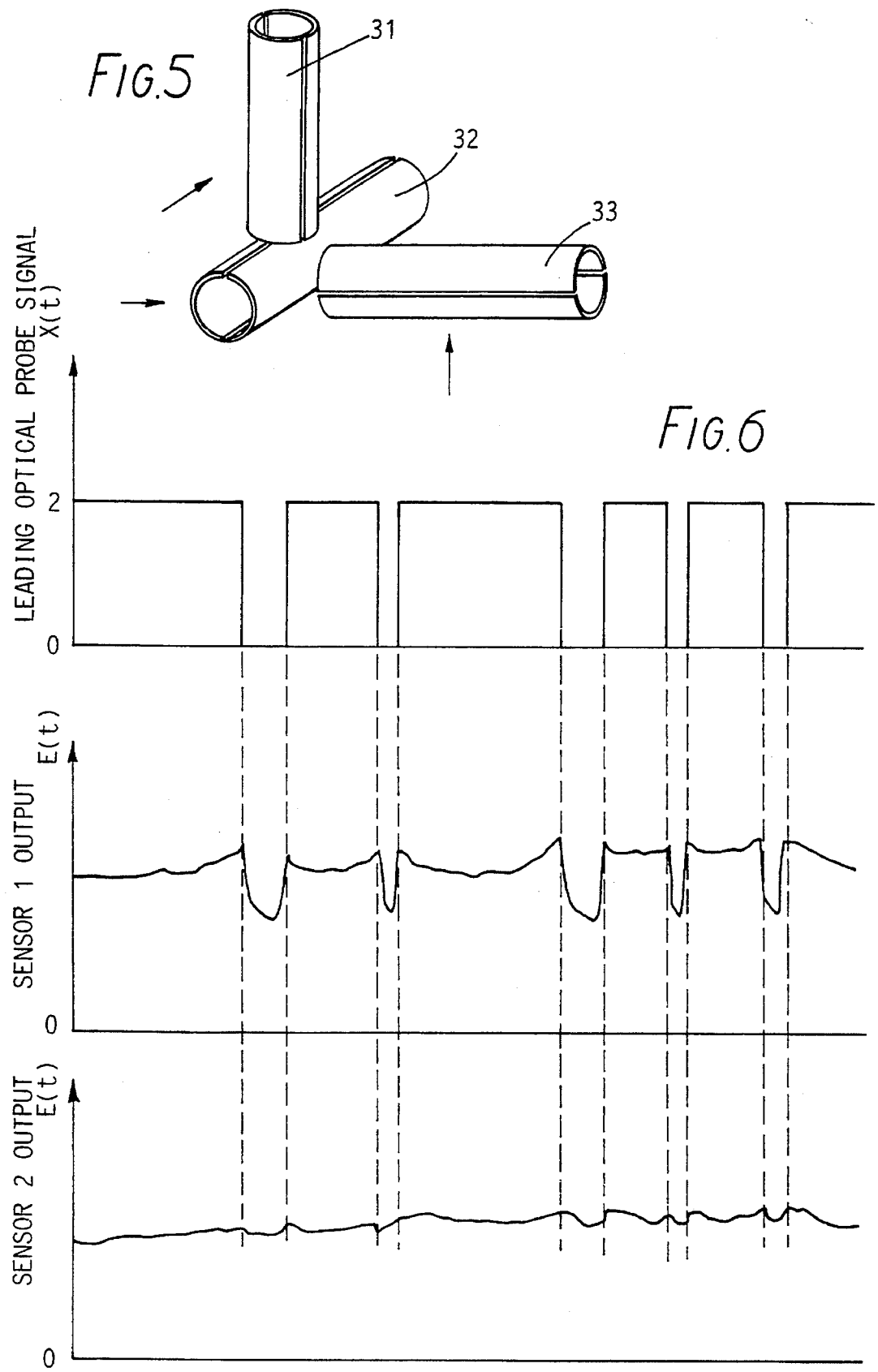

METHOD AND APPARATUS FOR MEASURING THE RATE OF FLOW OF THE CONTINUOUS PHASE OF A MULTIPHASE FLUID

This application is a file wrapper continuation of parent application Ser. No. 08/060,082, filed May 10, 1993, now abandoned.

BACKGROUND OF THE INVENTION

1. Field of the Invention

This invention relates to multiphase fluid flow measurement, and concerns in particular measurement of the rate of flow of a multiphase fluid mixture such as those commonly encountered in oil wells.

2. Description of the Prior Art

The fluids commonly encountered in oil wells are usually two- or three-phase fluids, being for the most part a mixture of water and oil or of water, gas and oil. One of the liquid phases—the water or oil—will be the continuous phase (usually water), and the other liquid phase, and the gas (if present), will be dispersed phases in the form of bubbles or droplets, often with a wide size spectrum, distributed within the continuous phase. In a hole which is inclined from the vertical, the multiphase fluid begins to separate—because the components are of different densities—into two (or more) distinct flow regions, with the lighter oil and gas lying above the heavier water. Moreover, these flow regions move with significantly different velocities, so that a substantial velocity gradient can be set up across the bore, possibly even such as to cause an actual backflow in those regions immediately adjacent the underside of the casing (and because this situation is unstable, large structures can be formed which also travel along the bore). The net result is that flow meters comprising a turbine/propeller blade driven by the moving fluid which are commonly used in oil wells, experience contradictory forces across the diameter, and the output of a flow measuring system relying on such a device becomes inaccurate.

It has been proposed to avoid this problem by adopting a different approach to measuring such flows. This method relies on there first being prepared, either by calculation or by direct measurement, information defining the velocity profile over the entire cross-section of the casing, one such profile for each of a suitable range of casing deviations and multiphase mixture proportions. Then, for a real casing of a known deviation through which is passing a multiphase fluid of known composition, there are taken a number of discrete velocity measurements—that is, measurements of the fluids passing a detector device which has a sensing area which is substantially smaller than the cross-sectional area of the casing having a known location in the casing's cross-section—and after selecting the profile corresponding to that deviation and composition the resulting actual velocity measured at the known point is used to deduce the actual velocity distribution over the casing, and by integration over the whole area the fluid flow rate is calculated. This method hinges on the ability to measure fluid velocity accurately at a location, and there are various types of detector system that have been proposed for this purpose. One particularly satisfactory system involves the use of thermal anemometry. A thermal anemometry device uses a wirelike filament through which is passed an electric current causing the filament to heat up. As the filament heats its electrical resistance changes, and by noting the current flow through the filament, the temperature of the filament can be measured. If a cold fluid is caused to flow past and in thermal contact with the filament then some of the filament's heat is conducted away and the filament becomes colder. Its resistance therefore changes, and this resistance change, after suitable calibration of the device with the relevant fluid, can be used to provide an accurate measure of the velocity of the fluid past the filament.

Although a thermal anemometer can be utilised to provide very acceptable figures for the flow rate of a single phase fluid, it is considerably less satisfactory when used with a multiphase fluid such as often found in an oil well borehole. The problem is caused by the dispersed phase, such as the oil, having one thermal characteristic, being dispersed within the continuous phase, such as the water, having a second thermal characteristic. While the continuous phase is interacting with the anemometer's filament the instrument gives one set of readings, but when a droplet of the dispersed phase material interacts with the filament then the readings change. It is not known for certain when the interaction is with one or the other materials, it is difficult to interpret the output of the instrument to provide an accurate measurement of the velocities of either phase.

It is an object of the present invention to provide a method of determining the velocity of a multiphase flow in which the problems outlined above are obviated or mitigated.

SUMMARY OF THE INVENTION

The present invention provides a method of measuring the flow rate of a continuous phase in a flowing multiphase fluid comprising measuring a velocity of the fluid by thermal anemometry at a location in the flow and simultaneously measuring the passage of a discontinuous phase at the same location using a local probe system, and using the measurement of the discontinuous phase to correct the measurement of the continuous phase so as to derive the flow rate thereof.

A further aspect of the present invention provides apparatus for measuring the flow rate of a continuous phase in a flowing multiphase fluid comprising a thermal anemometer positioned at a location in the flow, a local probe system at the same location as the thermal anemometer and capable of measuring the passage of a discontinuous phase, and means for using the measurement from the local probe system to correct the measurement from the thermal anemometer so as to derive the flow rate of the continuous phase.

By placing the local probe system at the same location as the measuring position of the thermal anemometer, it is possible to compare the simultaneous measurements and identify the portions of the anemometer measurement which are due to the discontinuous phase. These portions can be stripped out of the measurement to leave only measurements due to the continuous phase, thus allowing the flow rate to be determined.

The thermal anemometer is typically a hot-wire or hot-film device. It is particularly preferred that a split-film device is used in which the hot film is divided into two spaced parts. This allows more accurate determination of the flow rate at the location in the direction that the two parts are spaced. Ideally, three orthogonally arranged split-film devices are used to measure flow in three orthogonal directions.

The local probe system comprises one or more sensors which are sensitive to the passage of the discontinuous phase, ie capable of indicating when the phase being sensed changes from one phase to another. A local probe has a sensing area which is significantly smaller than the cross-sectional area of the flow being measured and the sensor elements are typically of such a size that a major volume fraction of the dispersed phase droplets or bubbles are greater in size then the sensor element. Suitable sensor elements might be radiofrequency probes such as those described in U.S. Pat. No. 4,974,446 or optical fiber probes which have been proposed as sensors in multiphase flow measurement systems previously. Typically, two sensor elements will be situated adjacent the anemometer and spaced in the major direction of flow, or spaced pairs are arranged in an orthogonal arrangement where the anemometer is likewise arranged.

One typical thermal anemometer is that available from Dantec under the designation Type 55R11. The sensing element is a fine quartz cylinder about 70 micrometer diameter and 3 mm long (with an actual sensing length of around 1.25 mm) and carrying a platinum film about 1000 Ångstrom sealed and bonded conductively across a pair of suitable spaced metal prongs themselves mounted at the tip of a probe arm and fed with activating/film heating current. The probe can be accurately positioned in the flowing fluid, and once calibrated the current passing therethrough indicates the velocity of the fluid at that point (a "point", or region, a centimeter across is satisfactory for the present purpose). A preferred thermal anemometer is a split-film-type, also available from Dantec under the designation 55R55 or 55R56. In this case the platinum film is divided into two nearly identical parts around the quartz fiber separated by spaces extending axially on the surface of the fiber.

The output from the anemometer is fed electronically to a suitable processor, after which it is conveniently stored for subsequent analysis (although with a sufficiently fast computer it may be possible to analyze and display the required flow rate information in real time). This type of equipment is well known.

The inventive method actually provides a measure of the speed of the fluid as it travels past the chosen location. However, by knowing the likely velocity profile for a pipe which depends on deviation and the fluid composition there can be calculated the volume flow rate, as required.

The location chosen for the anemometer (and the local probe system) may be anywhere across and along the pipe, and generally it is only necessary that this location be known rather that it be in any particular place. In an oil well borehole it will be usual to mount the anemometer and local probe system within a tool which is then lowered down the well until it reaches the required depth. Again, in such a case the tool will probably be associated with centralizing (or other) spacer elements which enable it to be located with sufficient accuracy across (the diameter of) the borehole.

A typical local probe system comprises cleave-ended graded index optical fibers having a core diameter of 100 micrometer, a cladding diameter of 140 micrometer, and a numerical aperture of 0.29. Such a probe is available from Optronics of Cambridge.

The local probe is naturally aligned with the anemometer—that is to say, its tip is actually on a line with the anemometer's filament (in the along stream direction)—so that a phase boundary detection output from the probe is exactly correlated with the anemometer's output, and thus can directly be used in the analysis of the latter. The tip may obviously be anywhere along the filament, but most conveniently is central of the length thereof.

Only one local probe is necessary for the operation of the invention. However, if two such probes are employed, one spaced slightly downstream of the other, then the two probes can be used for the subsidiary purpose of permitting a measurement of the discontinuous phase velocity. This can be carried out because, the fluid being non-uniform in its physical make-up, identification of a particular portion of fluid is possible as recorded by the probe. Thus, although the random dispersion of one phase in another changes with time nevertheless over a short time, and thus over a short distance, it remains much the same, so that a short section of fluid measured at one location can, conveniently using any standard computer-based cross-correlation technique, actually be recognised by its measurement signature as it passes the second location a second or so later. By a "short time" there is meant a period such that the dispersed structure of the portion of fluid, and thus its effect on the local probe, does not change significantly as it traverses at the relevant speed the distance between the two measurement locations. In any particular case a suitable short time can be found by simple experimentation; in the case of the fluids in an oil well, however, by a "short time" there is generally meant a period of the order of a second and advantageously not less than a twentieth of a second. Accordingly, for such a fluid travelling at a speed up to about 1.5 m/s, a suitable spacing for the two optical probes is around 1 mm. A range of possible spacings is from 1 to 1.5 mm; larger distances may make it difficult to find the match because the profile has changed so much in the time taken.

The output from the (or each) optical probe is fed electronically, to a suitable processor, from which, converted as necessary, it is conveniently stored for subsequent use (although with a sufficiently fast computer it may be possible to make use of it in real time). This type of equipment is well known.

The information from the local probe is used to permit the analysis of the anemometer output to strip therefrom the dispersed phase signal and leave the desired continuous phase signal (from which may then be derived that phase's velocity and thus its flow rate). In principle this analysis and stripping is a simple computational exercise, best performed by a suitably programmed computer.

Once the continuous phase data has been obtained, it may be used to provide the required flow rate information based upon previously-obtained data for similar fluids flowing along pipes with the same deviation. Again, in principle this is a simple computational exercise, best performed by a suitably programmed computer (with an appropriate database of test data).

The method and apparatus of the invention has successfully provided useful flow rate information in pipes inclined at angles from 0° (vertical), through 15°, 30° and 45°, and for flow rates varying from 2 to 30 $m^3$/hr.

A flow rate logging tool made according to the invention is of a simple design, and relatively inexpensive to manufacture. It can be given a robust construction capable of withstanding the hostile environmental conditions encountered downhole. Furthermore, it is usable as a continuous logging device, being logged up and down the well, whilst making velocity estimates, in the same way that the presently-used spinner type device is utilised.

Since the present invention provides point measurements at discrete locations within a pipe, it is often not possible to obtain accurate bulk characteristics of the flow in the whole pipe from a single measurement. In order to overcome the problem of the variation of the velocity profile in the pipe, the technique conveniently involves scanning the apparatus across the pipe, or providing several simultaneous measurements at locations across the pipe, and integrating the results to obtain bulk flow properties. Typically any number of measurements can be made, usually in the range of 16–56 measurements before integration.

BRIEF DESCRIPTION OF THE DRAWINGS

Various embodiments of the invention are now described, though by way of illustration only, with reference to the accompanying diagrammatic drawings in which:

FIG. 3 shows combined the graphical outputs of the anemometer and two optical probes of FIG. 1;

FIG. 4A shows a detailed view of the sensing section of an alternative embodiment of the invention to that shown in FIG. 1;

FIG. 4B shows the embodiment of FIG. 4A when viewed as arrow A in FIG. 1A;

FIG. 5 shows a further arrangement of anemometers for use in the present invention; and FIG. 6 shows the signals from the sensors in the arrangement of FIGS. 4A and B.

DESCRIPTION OF THE PREFERRED EMBODIMENT

Figure 1B:
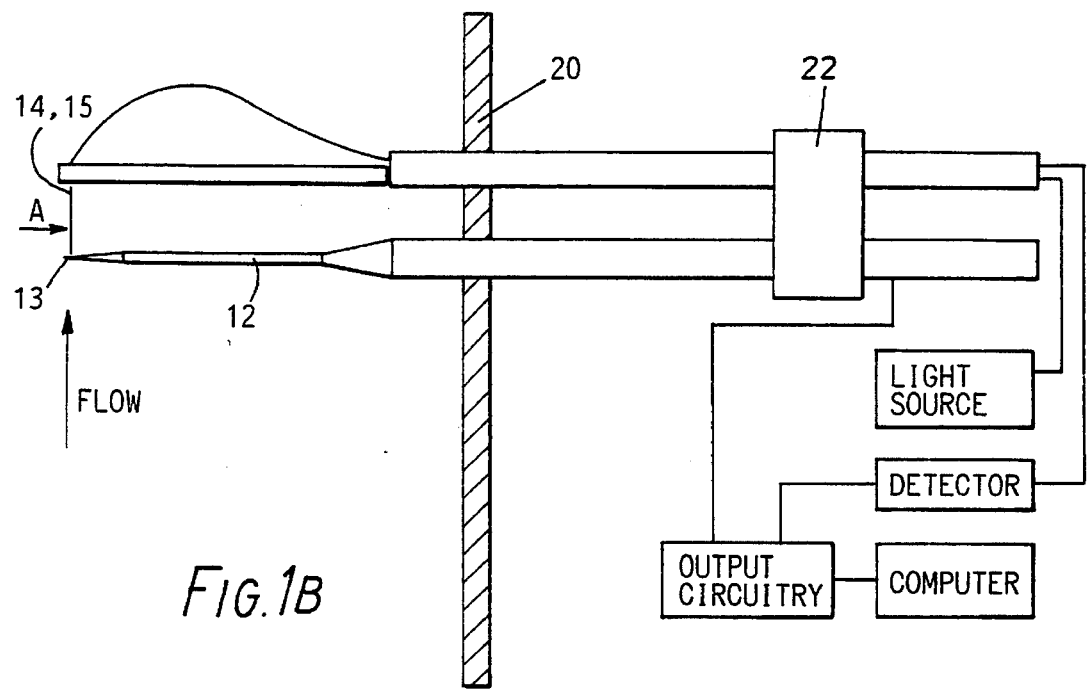
FIG. 1B shows a diagrammatic side view of fluid flow measurement apparatus according to one embodiment of the invention.
Figure 1A:
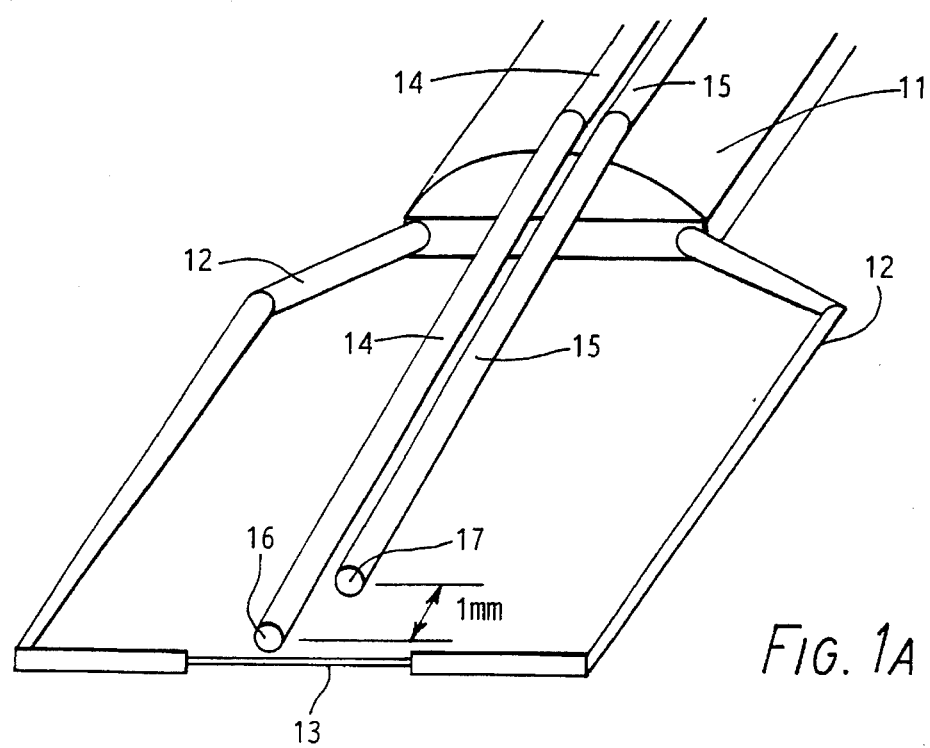
FIG. 1A shows a perspective view of the sensing section of fluid flow measurement apparatus according to the invention.

FIG. 1A shows a perspective view of the tip of a conventional thin film anemometer fitted with two optical probes in accordance with one embodiment of the invention, and intended in use to be positioned within a flowing multiphase fluid to measure the velocity thereof (and especially the velocity, and thus rate of flow, of the continuous phase component).

The anemometer has a generally elongate cylindrical body (11) from which project forwardly a pair of spaced electrically conductive prongs (as 12) across the very tips of which is strung, bonded thereto by a thin gold layer, a fine platinum-coated quartz filament (13) having a very thin quartz insulating layer (not shown). The spacing of the prongs, and thus the length of the filament 13, is about 3 mm, the central sensing pan being about 1.25 mm long.

The prongs are separately connected through the body 11 to electrical circuitry (not shown) to means (also not shown) for delivering an electric current through the filament, and for then measuring the electrical resistance of the filament.

In use, an electric current is passed through the filament 13 to heat it up to a predetermined temperature. However, if the filament has a thermally-conductive fluid flowing past it then that fluid will remove some of the heat in the filament, so cooling the filament, whereupon its temperature will decrease. The amount of heat removed depends upon the thermal conductivity of the fluid and its velocity past the filament, so that after a suitable calibration process (by testing the effect with known fluids at known velocities), increase in current required to maintain the predetermined temperature can be used as an indication of the velocity of the fluid flowing past.

Secured (by means not shown) to top and bottom (as viewed) of the anemometer body 11, and extending forwards to end at or near the filament 13, are two optical probes (14 on top, 15 below) each formed from a length of graded index 140-on-100 micrometer optical fiber with its end (respectively 16 and 17) straight cut (cut, that is, at right angles to the fiber's optical axis). The end 16 of the upper probe 14 is aligned exactly with the filament 13 of the anemometer, while the end 17 of the lower probe 15 is set back, trailing the upper one by about 1 mm.

Each fiber 14, 15 is connected to a light source and to a detector for detecting the light reflected back up the fibers from the tip 16, 17, and operatively connected to the latter is output circuitry for providing an output indicative of the exact time the reflected light exhibited a change in intensity commensurate with a passing of a phase boundary over the tip.

The information gathered by the anemometer and by the optical probes may then be combined in a suitably programmed computer to generate an output indicative of the velocity (and thus flow rate) of the continuous phase of the fluid in which the equipment has been positioned.

The equipment of the invention measures fluid velocity at a discrete location, but to convert this to a useful measurement of the flow rate through a pipe such as an oil well borehole it is necessary to know something about the velocity profile over the area of the pipe at the relevant position along the pipe. This information comes from tests on fluids of known composition flowing at known rates through a known pipe.

In the embodiment shown in FIG. 1B, the apparatus is located outside a pipe 20 and projects into the flow through the wall of the pipe. A traversing mechanism 22 is provided to scan the apparatus across the pipe 20. Where the apparatus comprises a downhole tool, the traversing mechanism and detector are located inside a tool body and the apparatus projects out of the body into the flow (ie the pipe 20 becomes the tool body when viewing FIG. 1B). Alternatively several sensors are used to provide the appropriate number of measurements to be integrated when the measurements are analysed.

Figure 2A:
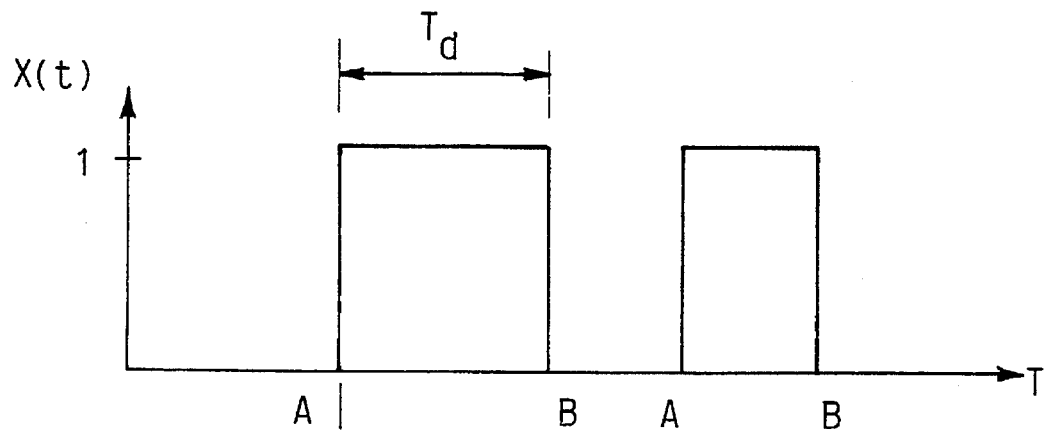
FIGS. 2A & B show graphically the output of two spaced optical probes looking at oil dispersed in water passing along a channel.
Figure 2B:
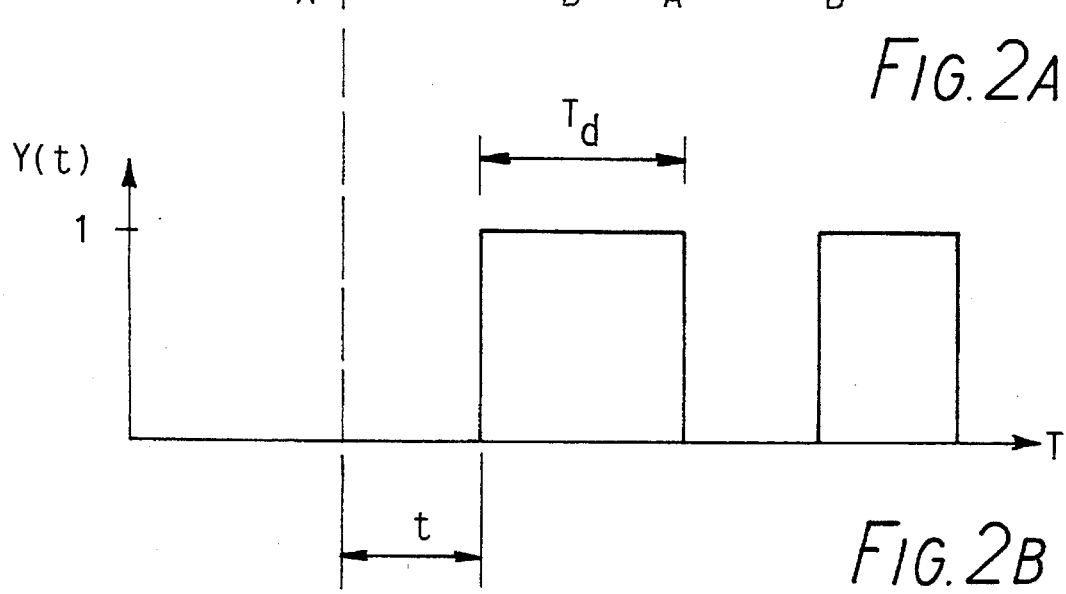
FIG. 2C shows the droplets of oil dispersed in the water passing along the channel.
Figure 2C:
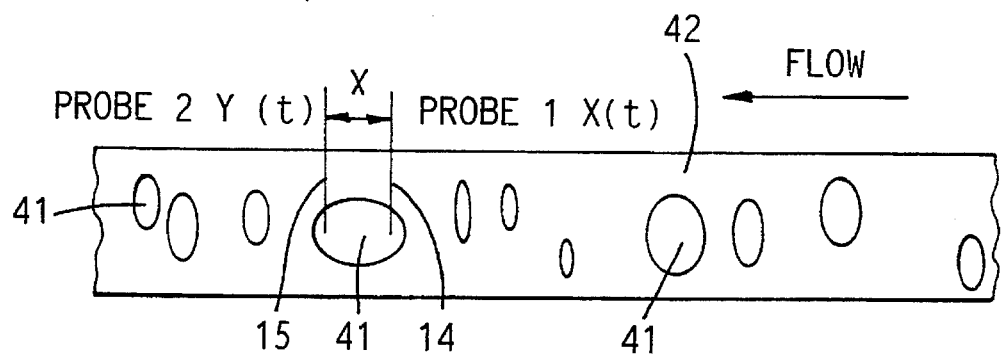

FIG. 2C shows diagrammatically the concept of droplets of oil (as 41) dispersed in water (42) flowing along a pipe (43) and moving successively past the two optical probes 14, 15. The (processed) output of each probe is shown in FIGS. 2A (for the upstream probe 14, here shown as probe 1) and 2B (for the downstream probe 15, here shown as probe 2). Not only does the sharp change in probe output clearly mark the beginning (A) and end (B) of each oil droplet, but the similarity between the two outputs enables the short length of fluid to be identified (by a cross correlation process), so that the actual velocity of the droplets themselves can be determined simply by measuring how long (time Δt) they take to travel the short distance (x) between the probes.

FIG. 3 shows graphically the outputs from the two optical probes superimposed upon the output of the anemometer. In this particular case it is clear to the naked eye when the anemometer output changed because of the intersection of the filament with an oil droplet, but in a real fluid things are not so clear, so that the sharp change signalled by the optical probes is highly useful to identify that occurrence, and thus to ease and simplify the operation of separating the continuous phase (water) signals from the dispersed phase (oil) signals.

The embodiment shown in part in FIGS. 4A and B is essentially the same as that shown in FIGS. 1A and B except that the platinum coating on the filament 13 is divided axially into two parts so as to form an upstream sensor U and a downstream sensor D. By determining the difference in coating between the sensors U and D, the magnitude of the flow in the direction of the spacing can be determined. In the single film case, the sensor will produce the same response irrespective of the direction of flow. In the split film case, the two parts are not quite identical so that the direction of flow can be derived as well as the magnitude. The output of sensors U and D and the output of the leading probe 14 is shown in FIG. 6

The optimum arrangement of split film anemometer is shown in FIG. 5 in which there are three split-film anemometers 31, 32 and 33 aligned in mutually orthogonal directions. This will allow the components of flow in any direction to be derived.

I claim:

1. A method for measuring a flow rate of a continuous phase in a flowing multiphase fluid which comprises a continuous phase and a discontinuous phase, the method comprising:
    a) measuring a velocity of the continuous phase using thermal anemometry at a location in the flow,
    b) measuring the passage of the discontinuous phase using a local probe system at the said location; and
    c) using a measurement of the passage of the discontinuous phase from the local probe system to correct the velocity of the continuous phase measured by thermal anemometry so as to derive the flow rate of the continuous phase.

2. A method as claimed in claim 1, further comprising using a hot-film device for thermal anemometry.

3. A method as claimed in claim 2, comprising using a hot-film device which has its film split into two parts, the parts being separated in a direction of flow of the multiphase fluid.

4. A method as claimed in claim 1, further comprising using an optical probe in the local probe system.

5. A method as claimed in claim 1, using a radiofrequency probe in the local probe system.

6. A method as claimed in claim 1, further comprising using a local probe system comprising two probes spaced apart in a direction of flow of the multiphase fluid.

7. A method as claimed in claim 6, further comprising analysing measurements from the two probes so as to derive a flow rate for the discontinuous phase.

8. A method as claimed in claim 1, further comprising making a plurality of simultaneous measurements at locations across the flowing multiphase fluid.

9. A method as claimed in claim 1, further comprising making a series of measurements at different locations across the flowing multiphase fluid.

10. Apparatus for measuring a flow rate of a continuous phase in a flowing multiphase fluid comprising a continuous phase and a discontinuous phase, the apparatus comprising:
    a) a thermal anemometer positioned at a location in the flowing multiphase fluid and measuring a velocity of the flowing multiphase fluid;
    b) a local probe system at said location for measuring the passage of the discontinuous phase; and
    c) means for using a measurement of the passage of the discontinuous phase from the local probe system to correct the velocity measured by the thermal anemometer and derive the flow rate of the continuous phase.

11. Apparatus as claimed in claim 10, wherein the thermal anemometer comprises a hot-film device.

12. Apparatus as claimed in claim 11, wherein the hot-film device comprises a device which has its film split into two parts, the parts being separated in a direction of flow in the multiphase fluid.

13. Apparatus as claimed in claim 10, wherein the local probe system comprises an optical probe.

14. Apparatus as claimed in claim 13, wherein the local probe system comprises a radiofrequency probe.

15. Apparatus as claimed in claim 10, wherein the local probe system comprises two probes spaced apart in a direction of flow of the fluid.

16. Apparatus as claimed in claim 15, further comprising means for analysing measurements from the two probes so as to derive a flow rate for the discontinuous phase.

17. Apparatus as claimed in claim 10, further comprising a plurality of thermal anemometers and local probe systems at locations across the flowing multiphase fluid.

18. Apparatus as claimed in claim 10, further comprising means for moving the thermal anemometer and the local probe system across the flowing multiphase fluid.

19. Apparatus as claimed in claim 10, further comprising a plurality of thermal anemometers arranged to measure flow in mutually orthogonal directions.

* * * * *